United States Patent
Park et al.

(10) Patent No.: US 10,978,753 B2
(45) Date of Patent: Apr. 13, 2021

(54) BATTERY MODULE

(71) Applicant: Samsung SDI Co., Ltd., Yongin-si (KR)

(72) Inventors: Juyong Park, Yongin-si (KR); Hyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/340,985

(22) PCT Filed: Sep. 14, 2017

(86) PCT No.: PCT/KR2017/010100
§ 371 (c)(1),
(2) Date: Apr. 10, 2019

(87) PCT Pub. No.: WO2018/070674
PCT Pub. Date: Apr. 19, 2018

(65) Prior Publication Data
US 2020/0185795 A1   Jun. 11, 2020

(30) Foreign Application Priority Data
Oct. 13, 2016  (KR) .................. 10-2016-0132846

(51) Int. Cl.
*H01M 10/613* (2014.01)
*H01M 10/6552* (2014.01)
(Continued)

(52) U.S. Cl.
CPC ..... *H01M 10/613* (2015.04); *H01M 10/6552* (2015.04); *H01M 10/6554* (2015.04); *H01M 10/6556* (2015.04); *H01M 10/6568* (2015.04)

(58) Field of Classification Search
None
See application file for complete search history.

(56) References Cited

U.S. PATENT DOCUMENTS

| 4,687,232 A | 8/1987 | Zimmermann |
| 5,378,555 A * | 1/1995 | Waters ................ H01M 2/1083 |
| | | 429/97 |

(Continued)

FOREIGN PATENT DOCUMENTS

| JP | 2015-096416 A | 5/2015 |
| KR | 10-2012-0062207 A | 6/2012 |

(Continued)

OTHER PUBLICATIONS

Korean Office Action from corresponding Korean Patent Application No. 10-2016-0132846, Korean Office action dated Dec. 9, 2020 (5 pgs.).

*Primary Examiner* — Scott J. Chmielecki
(74) *Attorney, Agent, or Firm* — Lewis Roca Rothgerber Christie LLP (57) ABSTRACT

Provided is a battery module. The battery module includes a lower cooling tube arranged in the lower cooling plate, an upper cooling tube arranged in the upper cooling plate, the upper cooling tube being connected to the lower cooling tube and arranged in a different plane than the lower cooling tube, and a branching portion connecting the lower cooling tube to the upper cooling tube, wherein the branching portion includes a lower connection tube connected to the lower cooling tube, an upper connection tube connected to the upper cooling tube, a lower connection housing arranged to surround an outer surface of the lower connection tube, and an upper connection housing arranged to surround an outer surface of the upper connection tube, the upper connection housing being coupled to the lower connection housing.

8 Claims, 9 Drawing Sheets

(51) Int. Cl.
*H01M 10/6554* (2014.01)
*H01M 10/6556* (2014.01)
*H01M 10/6568* (2014.01)

(56) References Cited

U.S. PATENT DOCUMENTS

| | | | |
|---|---|---|---|
| 8,974,934 B2 | 3/2015 | Merriman et al. | |
| 9,676,291 B2 | 6/2017 | Haussmann | |
| 2011/0024207 A1* | 2/2011 | Higashino | H01M 10/613 |
| | | | 180/65.1 |
| 2011/0206970 A1* | 8/2011 | Itoi | H01M 10/6557 |
| | | | 429/120 |
| 2013/0260194 A1* | 10/2013 | Meyer | H01M 10/6552 |
| | | | 429/72 |
| 2013/0295422 A1* | 11/2013 | Kim | B60L 58/21 |
| | | | 429/72 |
| 2014/0050952 A1* | 2/2014 | Merriman | H01M 10/6556 |
| | | | 429/72 |
| 2015/0118538 A1* | 4/2015 | Haussmann | B60L 58/26 |
| | | | 429/120 |
| 2016/0141569 A1* | 5/2016 | Mascianica | H01M 10/625 |
| | | | 429/99 |
| 2017/0346146 A1* | 11/2017 | Kim | H01M 10/625 |
| 2019/0237828 A1* | 8/2019 | Park | H01M 2/10 |
| 2019/0319318 A1* | 10/2019 | Park | H01M 10/613 |

FOREIGN PATENT DOCUMENTS

| | | |
|---|---|---|
| KR | 10-2012-0096133 A | 8/2012 |
| KR | 10-1195425 B1 | 10/2012 |
| KR | 10-2013-0064969 A | 6/2013 |
| KR | 10-2013-0113740 A | 10/2013 |
| KR | 10-1446109 B1 | 10/2014 |
| KR | 10-2015-0043337 A | 4/2015 |
| KR | 20-0478852 Y1 | 11/2015 |

\* cited by examiner

BATTERY MODULE

CROSS-REFERENCE TO RELATED APPLICATION(S)

This application is a National Phase Patent Application of International Patent Application Number PCT/KR2017/010100, filed on Sep. 14, 2017, which claims priority of Korean Patent Application No. 10-2016-0132846, filed Oct. 13, 2016. The entire contents of both of which are incorporated herein by reference.

TECHNICAL FIELD

The present disclosure relates to an apparatus, and more particularly, to a battery module.

BACKGROUND ART

In general, a secondary battery is rechargeable and dischargeable unlike a primary battery that may not be recharged. A secondary battery is used as an energy source in mobile devices, electric vehicles, hybrid vehicles, electric bicycles, and uninterruptible power supplies, and may be in the form of a single battery or a battery module, in which a plurality of batteries are electrically connected as a single unit, depending on the kinds of external devices to which the secondary battery is applied.

DESCRIPTION OF EMBODIMENTS

Technical Problem

A small-sized mobile device such as a mobile phone is operable using the output and capacity of a single battery, but electronic vehicles or hybrid vehicles consume a relatively large amount of electric power to drive with high electric power for a long time, and thus employ a module type including a plurality of batteries. In addition, an output voltage or an output current may increase according to the number of batteries included in the module.

Solution to Problem

Embodiments of the present disclosure provide battery modules.

An aspect of the present disclosure may provide a battery module including: a lower cooling tube arranged in the lower cooling plate, an upper cooling tube arranged in the upper cooling plate, the upper cooling tube being connected to the lower cooling tube and arranged in a different plane than the lower cooling tube, and a branching portion connecting the lower cooling tube to the upper cooling tube, wherein the branching portion includes a lower connection tube connected to the lower cooling tube, an upper connection tube connected to the upper cooling tube, a lower connection housing arranged to surround an outer surface of the lower connection tube, and an upper connection housing arranged to surround an outer surface of the upper connection tube, the upper connection housing being coupled to the lower connection housing.

Advantageous Effects of Disclosure

According to embodiments of the present disclosure, cooling tubes of a battery module, arranged on different planes, may be simply connected to each other through a connection portion. In addition, when the cooling tubes arranged on different planes are connected to each other, the cooling tubes may be sealed to thereby prevent the battery module from being failed or damaged due to a leakage, and the life of the battery module may increase. Since the cooling tubes arranged on different planes are connected to each other through connection housings, a flow path of cooling water may be secured even if the centers of the connection tubes are displaced from each other. In addition, since a space is formed between the connection housings, a back flow phenomenon inside the connection tubes may be reduced.

BEST MODE

An aspect of the present disclosure may provide a battery module including: a lower cooling tube arranged in the lower cooling plate, an upper cooling tube arranged in the upper cooling plate, the upper cooling tube being connected to the lower cooling tube and arranged in a different plane than the lower cooling tube, and a branching portion connecting the lower cooling tube to the upper cooling tube, wherein the branching portion includes: a lower connection tube connected to the lower cooling tube, an upper connection tube connected to the upper cooling tube, a lower connection housing arranged to surround an outer surface of the lower connection tube, and an upper connection housing arranged to surround an outer surface of the upper connection tube, the upper connection housing being coupled to the lower connection housing.

The branching portion may further include a tube sealing portion arranged in at least one of an area between the lower connection housing and the lower connection tube and an area between the upper connection housing and the upper connection tube.

The branching portion may further include a fixing portion arranged in the upper connection tube and the lower connection tube and fixing a position of the tube sealing portion.

The branching portion may further include a housing sealing portion arranged between the upper connection housing and the lower connection housing.

A cross-sectional area of a space formed by the upper connection housing and the lower connection housing may be greater than at least one of a cross-sectional area of the upper connection tube perpendicular to a longitudinal direction of the upper connection tube and a cross-sectional area of the lower connection tube perpendicular to a longitudinal direction of the lower connection tube.

The upper connection tube and the upper connection housing may be integrated and/or the lower connection tube and the lower connection housing may be integrated.

The battery module may further include a lower branching block arranged between the lower cooling tube and the lower connection tube.

The battery module may further include an upper branching block arranged between the upper cooling tube and the upper connection tube.

Mode of Disclosure

The present disclosure will be more apparent from embodiments described below in detail with reference to the accompanying drawings. The embodiments may, however, have different forms and should not be construed as being limited to the descriptions set forth herein. Rather, these embodiments are provided so that this disclosure will be thorough and complete, and will fully convey the scope of the present disclosure to those skilled in the art. Therefore, the scope of the present disclosure should be defined by the claims. In the following description, technical terms are used only for explaining example embodiments, and not for purposes of limitation. The terms of a singular form may include plural forms unless specifically mentioned. The meaning of 'comprises' and/or 'comprising' specifies an element, a step, an operation, and/or a device but does not exclude other elements, steps, operations, and/or devices. It will be understood that although the terms "first," "second," etc. may be used herein to describe various elements, these elements should not be limited by these terms. These terms are only used to distinguish one element from another.

Figure 1:
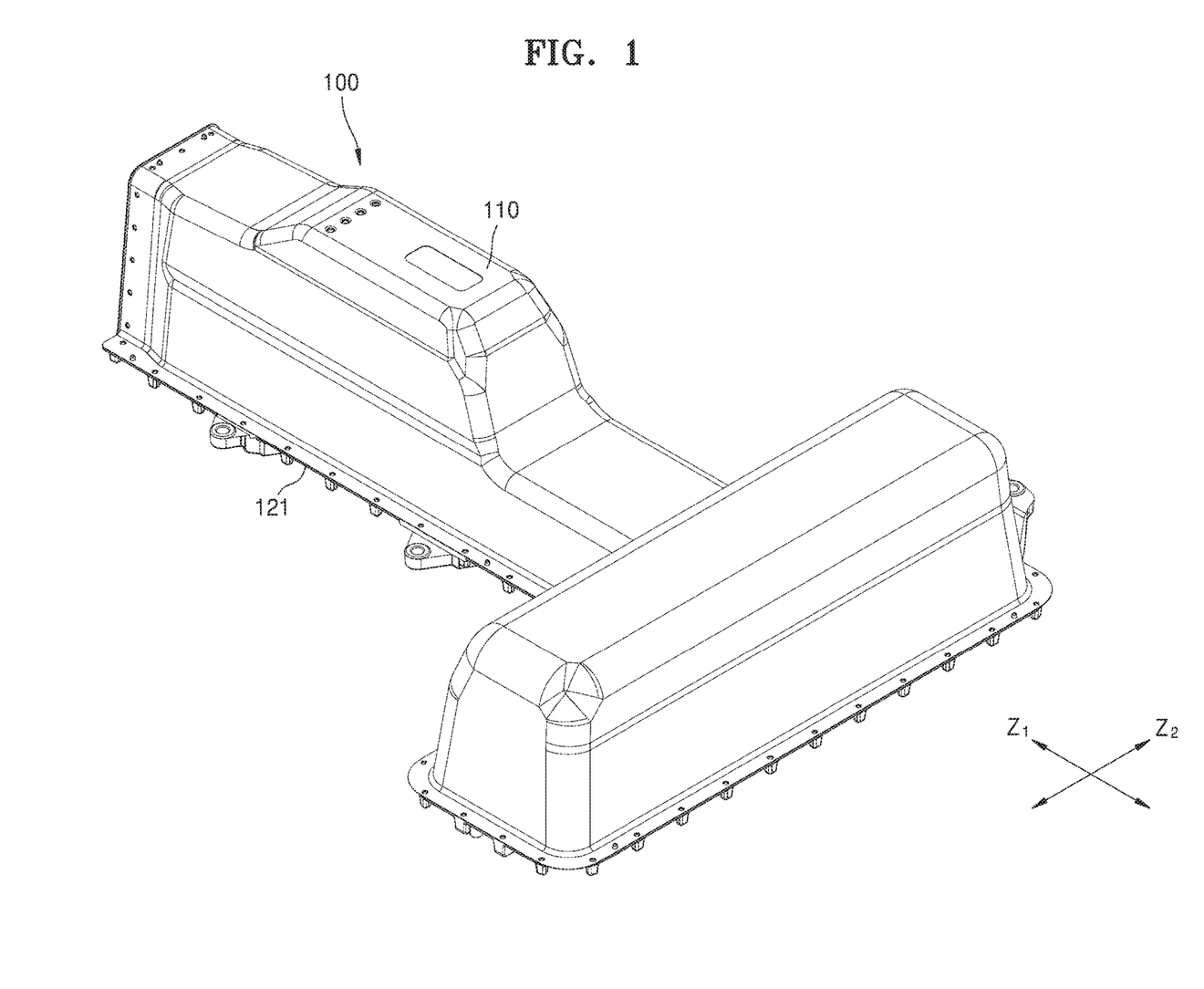
FIG. 1 is a perspective view of a battery module according to an embodiment of the present disclosure.

FIG. 1 is a perspective view of a battery module 100 according to an embodiment of the present disclosure.

Referring to FIG. 1, the battery module 100 may include a lower cooling plate 121 arranged on the bottom of the battery module 100 and a plurality of battery packs arranged on the lower cooling plate 121, and may further include a cover 110 installed to face the lower cooling plate 121 to form an accommodation space for the battery packs and for protecting the plurality of battery packs from an external environment. The lower cooling plate 121 and the cover 110 may be formed in the same shape so as to be assembled facing each other, for example, a T shape extending a first direction Z1 and a second direction Z2, which are different from each other.

Figure 2:
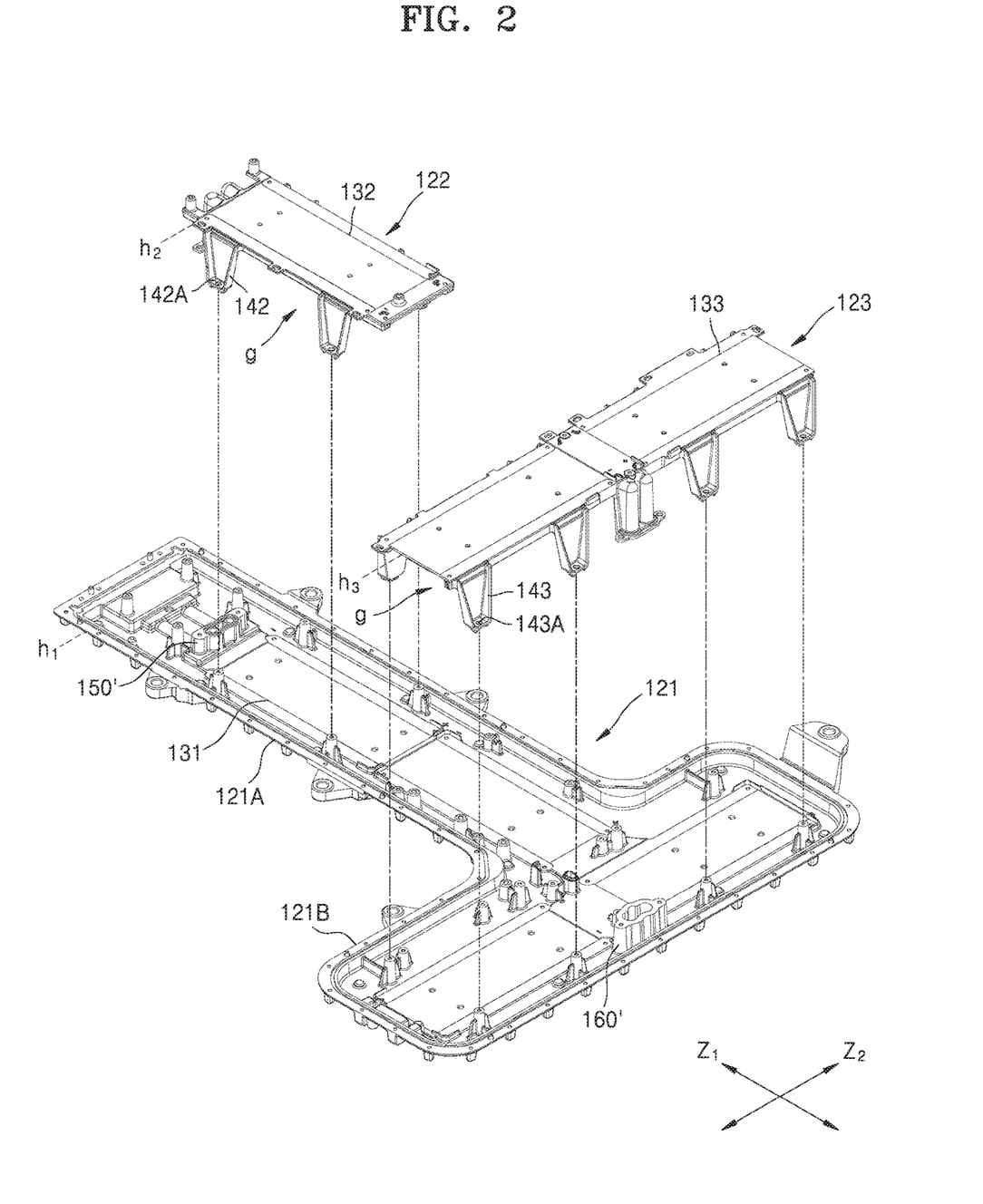
FIG. 2 is an exploded perspective view of the internal structure of the battery module shown in FIG. 1.
Figure 3:
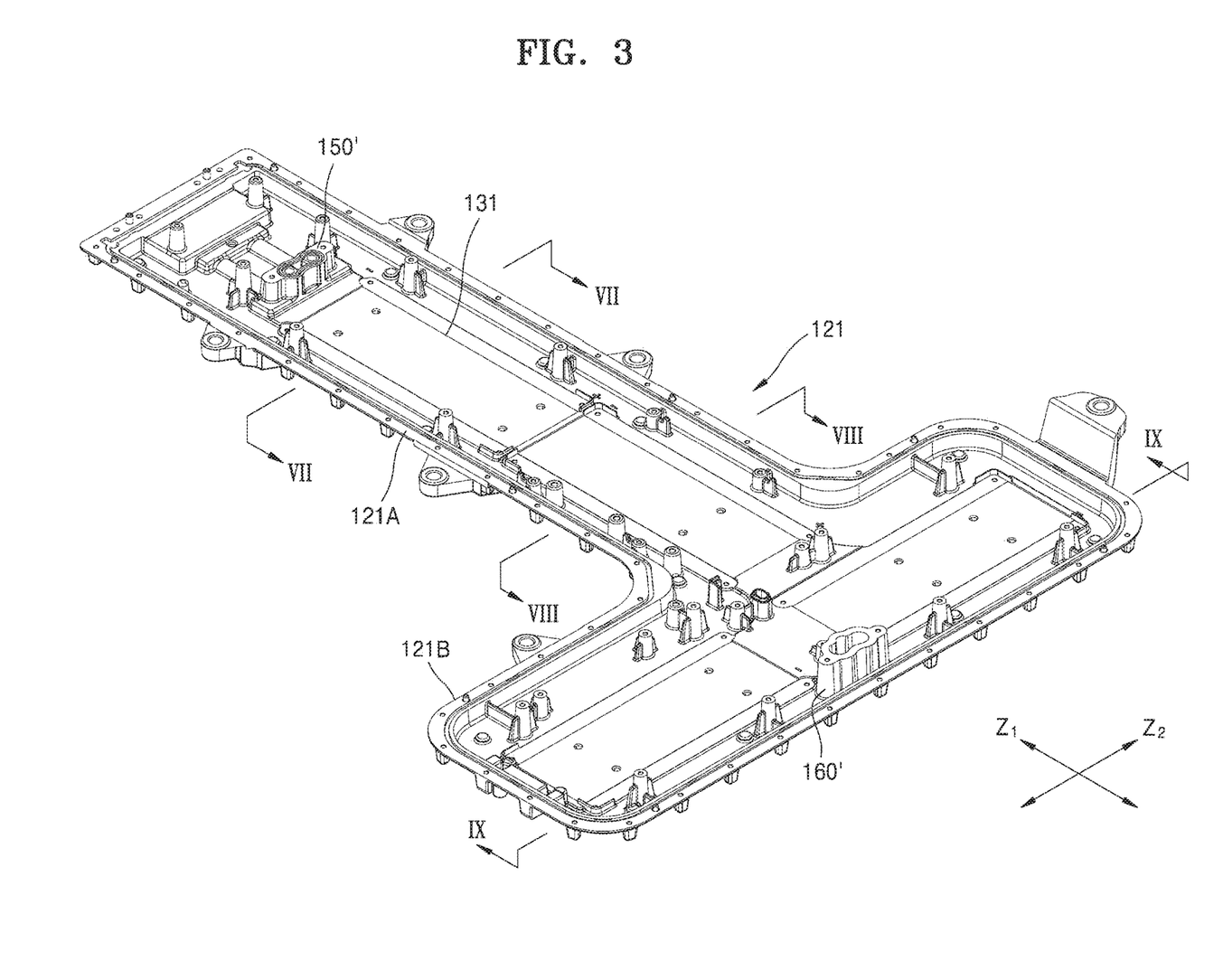
FIG. 3 is a perspective view of a lower cooling plate shown in FIG. 2.
Figure 4:
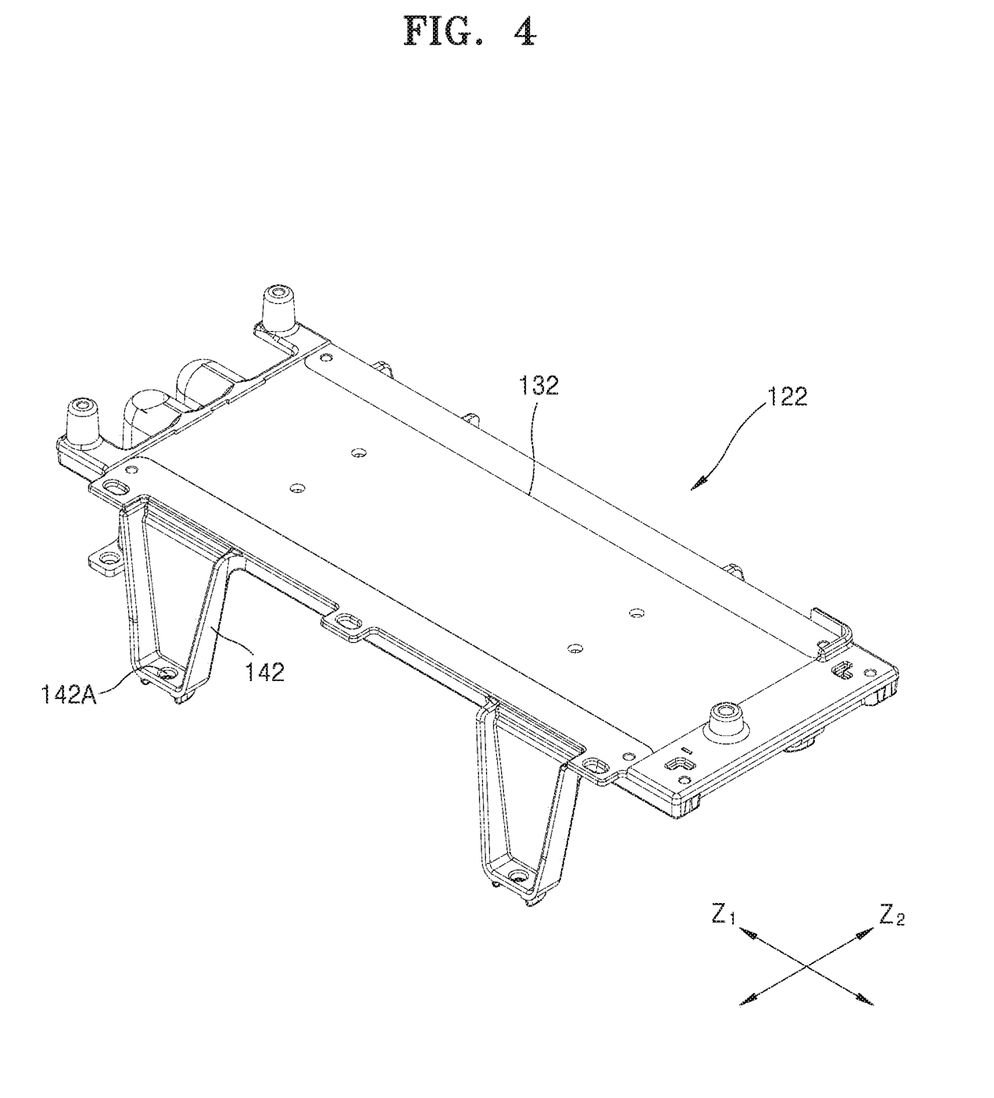
FIG. 4 is a perspective view of a first upper cooling plate shown in FIG. 2.
Figure 5:
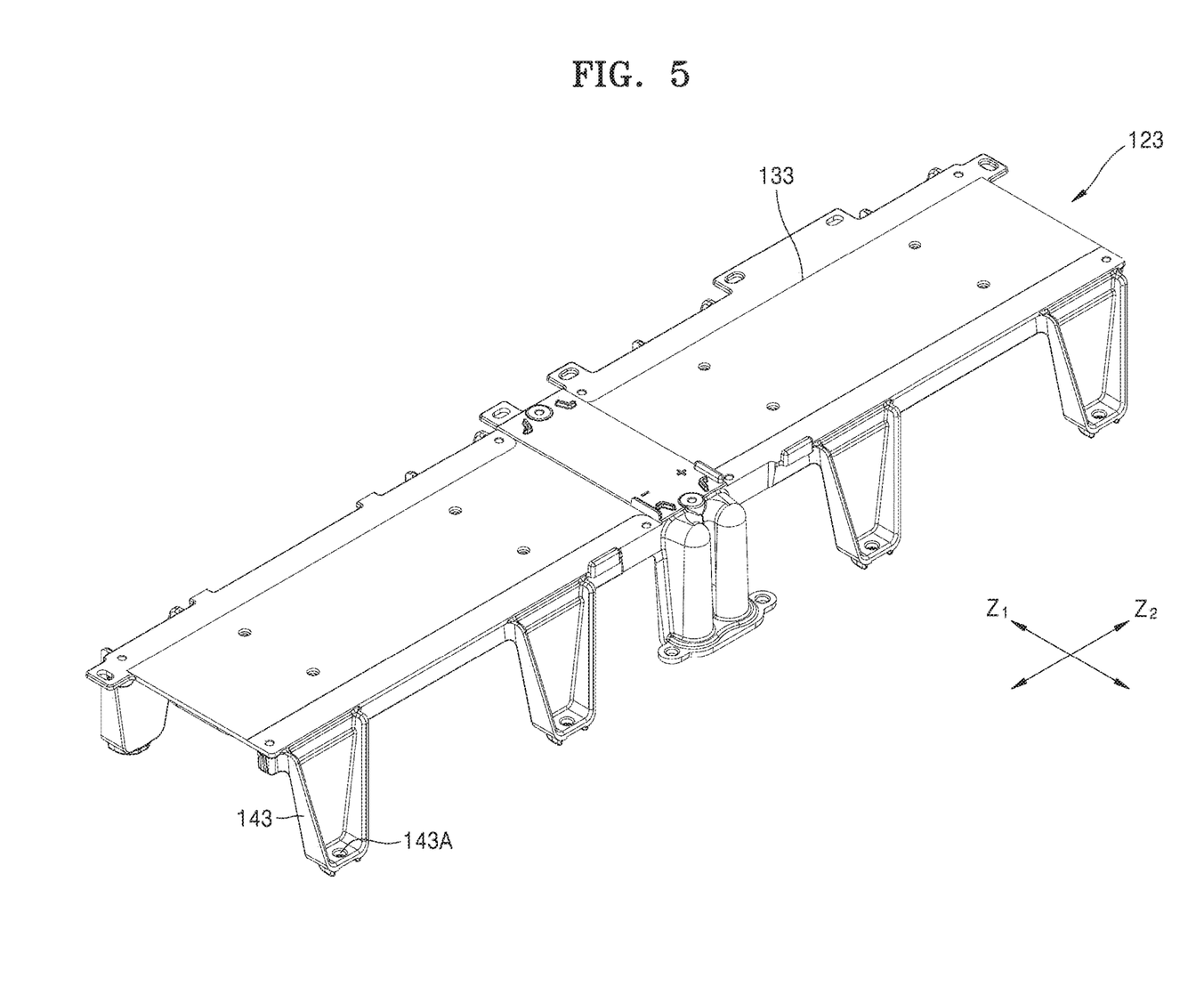
FIG. 5 is a perspective view of a second upper cooling plate shown in FIG. 2.

FIG. 2 is an exploded perspective view of the internal structure of the battery module 100 shown in FIG. 1. FIGS. 3 to 5 are perspective views of a lower cooling plate 121, a first upper cooling plate 122, and a second upper cooling plate 123, shown in FIG. 2.

Referring to FIGS. 2 to 5, the first upper cooling plate 122 spaced apart from the lower cooling plate 121 with a pack accommodation portion G therebetween and the second upper cooling plate 123 spaced apart from the lower cooling plate 121 with the pack accommodation portion G therebetween may be arranged over the lower cooling plate 121.

The lower, first upper, and second upper cooling plates 121, 122, and 123 may include battery pack seating portions 131, 132, and 133, respectively, which are in direct contact with battery packs (not shown) to seat at least one battery pack. The lower, first upper, and second upper cooling plates 121, 122, and 123, which dissipate heat from the battery packs, may dissipate the heat while also supporting the battery packs. For example, the lower cooling plate 121 may be arranged at a first level h1 corresponding to the bottom of the battery module 100 to support a battery pack of a first group and may dissipate heat from the battery pack of the first group. The first upper cooling plate 122 may be arranged at a second level h2 spaced upward from the first level h1 to support a battery pack of a second group and may dissipate heat from the battery pack of the second group. The second upper cooling plate 123 may be arranged at a third level h3 spaced upward from the first level h1 to support a battery pack of a third group and may dissipate heat from the battery pack of the third group.

The battery packs of the first to third groups may include at least one or more battery packs and may each include different numbers of battery packs. In an embodiment of the present disclosure, the battery pack of the first group may be arranged at the first level h1 corresponding to the bottom of the battery module 100 and may include the largest number of battery packs, and the battery pack of the second group may include the fewest number of battery packs. The number of battery packs included in the battery pack of the third group may be lower than the number of battery packs of the first group and greater than the number of battery packs of the second group.

In an embodiment of the present disclosure, the battery pack of the first group arranged on the lower cooling plate 121 may include four battery packs. As described below, the lower cooling plate 121 may include a longitudinal direction portion 121A extending in the first direction Z1 and a lateral direction portion 121B extending in the second direction Z2. Two battery packs may be arranged over the longitudinal direction portion 121A in the first direction Z1, and two battery packs may be arranged over the lateral direction portion 121B in the second direction Z2. The battery pack of the second group arranged on the first upper cooling plate 122 may include two battery packs. The first upper cooling plate 122 may extend in the first direction Z1 and two battery packs may be arranged on the first upper cooling plate 122 in the first direction Z1. In addition, the battery pack of the third group arranged on the second upper cooling plate 123 may include two battery packs. The second upper cooling plate 123 may extend in the second direction Z2 and two battery packs may be arranged on the second upper cooling plate 123 in the second direction Z2.

The lower cooling plate 121 includes a longitudinal direction portion 121A extending in the first direction Z1 and a lateral direction portion 121B extending in the second direction Z2 that is different from the first direction Z1. For example, the longitudinal direction portion 121A and the lateral direction portion 121B may respectively extend in the first and second directions Z1 and Z2 perpendicular to each other. Accordingly, the lower cooling plate 121 may have a T-shape as a whole.

The first upper cooling plate 122 may be formed over the longitudinal direction portion 121A of the lower cooling plate 121 and spaced apart from the longitudinal direction portion 121A with the pack accommodation portion G therebetween. In this case, the longitudinal direction portion 121A of the lower cooling plate 121 and the first upper cooling plate 122 may be parallel to each other in the first direction Z1. The second upper cooling plate 123 may be formed over the lateral direction portion 121B of the lower cooling plate 121 and spaced apart from the lateral direction portion 121B with the pack receiving portion g therebetween. In this case, the lateral direction portion 121B of the lower cooling plate 121 and the second upper cooling plate 123 may be parallel to each other in the second direction Z2. In this case, the first upper cooling plate 122 and the second upper cooling plate 123 may be spaced apart from each other.

The lower cooling plate 121 may form the bottom of the entire battery module and provide the base of the entire battery module. That is, the first and second upper cooling plates 122 and 123 may be supported on the lower cooling plate 121. To this end, the first and second upper cooling plates 122 and 123 may be provided with legs 142 and 143 for supporting the first and second upper cooling plates 122 and 123, respectively, at an upper position from the lower cooling plate 121. That is, the legs 142 and 143 may be respectively formed between the lower cooling plate 121 and the first upper cooling plate 122 and between the lower cooling plate 121 and the second upper cooling plate 123 and support the first and second upper cooling plates 122 and 123 with the pack accommodation portion G therebetween from the lower cooling plate 121. Coupling holes 142A and 143B may be formed in the legs 142 and 143 protruding from the first and second upper cooling plates 122 and 123, and the first and second upper cooling plates 122 and 123 may be fixed through a fastening member (not shown) that is inserted into the coupling holes 142A and 143A and coupled to the lower cooling plate 121.

The cover 110 (see FIG. 1) may be covered on the lower cooling plate 121 to which the first and second upper cooling plates 122 and 123 are fixed. The cover 110 may protect the battery packs of the first to third groups arranged on the lower, first upper, and second upper cooling plates 121, 122, and 123 from external environments. That is, the lower cooling plate 121 and the cover 110 may be assembled to face each other, and an accommodation space in which the battery packs of the first to third groups are accommodated may be formed. The lower cooling plate 121 and the cover 110 may be formed in the same shape, for example, a T shape, to be assembled to face each other.

Figure 6:
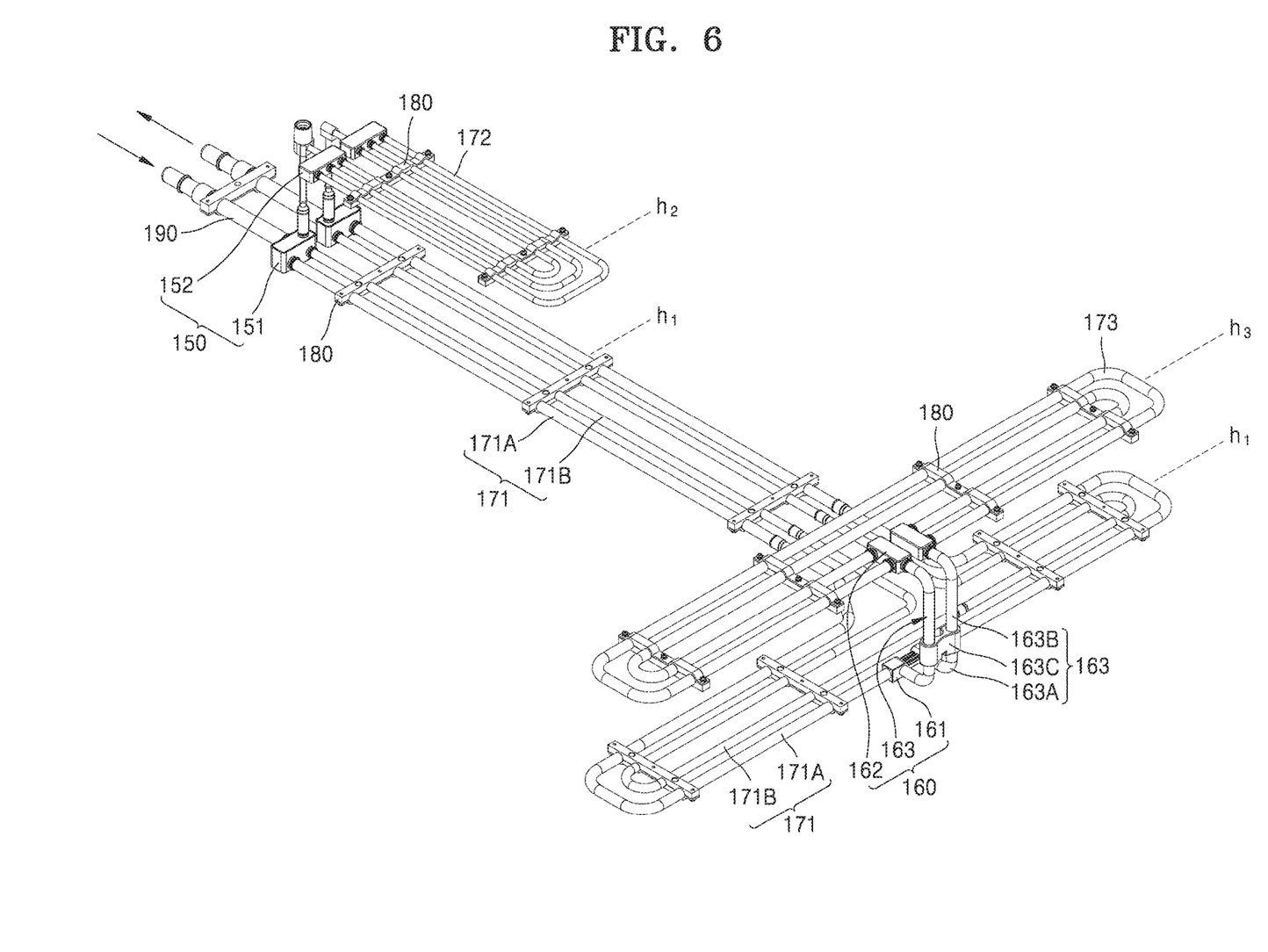
FIG. 6 is a perspective view showing a lower cooling tube, a first upper cooling tube, and a second upper cooling tube, embedded in the lower cooling plate, the first upper cooling plate, and the second upper cooling plate, respectively, shown in FIG. 2.
Figure 7:
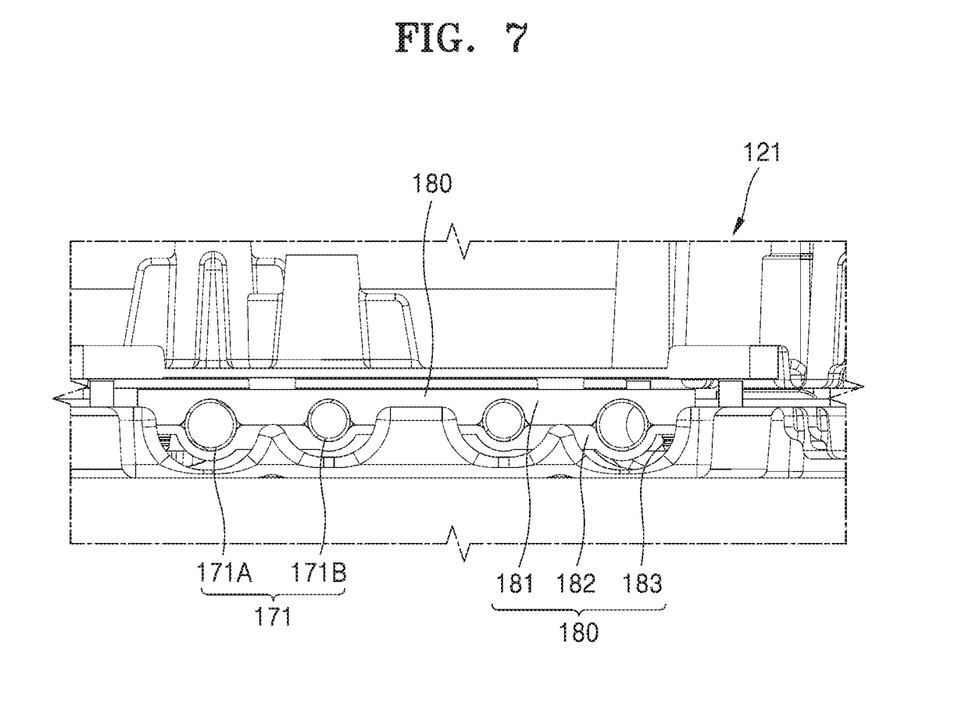
FIG. 7 is a cross-sectional view taken along line VII-VII in FIG. 3.
Figure 8:
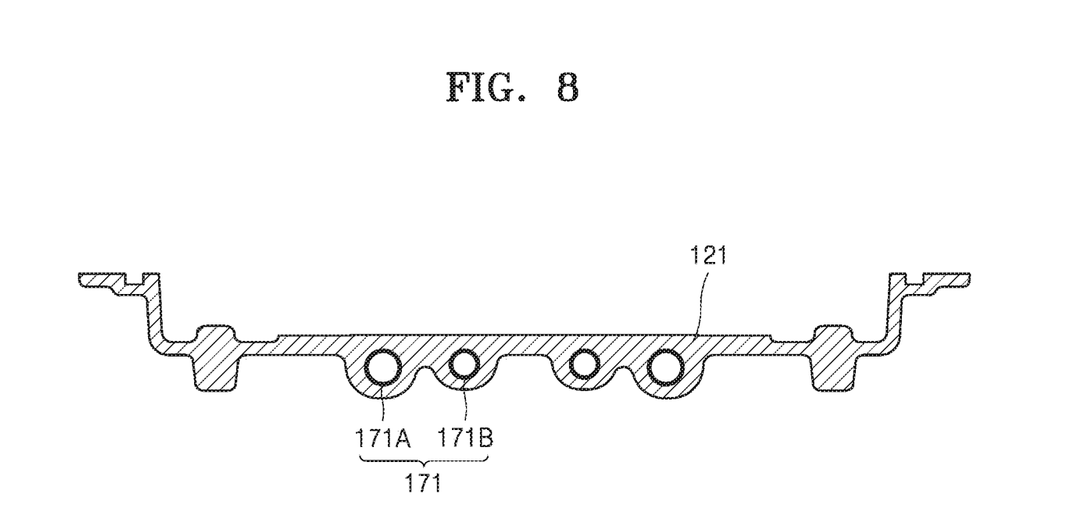
FIG. 8 is a cross-sectional view taken along line VIII-VIII in FIG. 3.

FIG. 6 is a perspective view showing a lower cooling tube 171, a first upper cooling tube 172, and a second upper cooling tube 173, embedded in the lower cooling plate 121, the first upper cooling plate 122, and the second upper cooling plate 123, respectively, shown in FIG. 2. FIG. 7 is a cross-sectional view taken along the line VII-VII in FIG. 3. FIG. 8 is a cross-sectional view taken along the line VIII-VIII in FIG. 3.

Referring to FIGS. 6 to 8, the lower, first upper, and second upper cooling plates 121, 122, and 123 may support the battery packs and may also thermally contact, for example, directly contact, the battery packs and dissipate heat from the battery packs. To this end, the lower, first upper, and second upper cooling plates 121, 122, and 123 may be provided with the lower, first upper, and second upper cooling tubes 171, 172, and 173, respectively. For example, the lower, first upper, and second upper cooling tubes 171, 172, and 173 may be embedded in the lower, first upper, and second upper cooling plates 121, 122 and 133, respectively. The lower, first upper, and second upper cooling tubes 171, 172, and 173 may be integrated with the lower, first upper, and second upper cooling plates 121, 122, and 123 while being embedded in the lower, first upper, and second upper cooling plates 121, 122, and 123, respectively.

The lower, first upper, and second upper cooling tubes 171, 172, and 173 may include dissimilar metal materials that are different from those of the lower, first upper, and second upper cooling plates 121, 122, and 123, and may be formed through die casting. For example, the lower, first upper, and second upper cooling plates 121, 122, and 123 may be formed in such a manner that molten metal for plate formation is injected into a mold (not shown) in which the lower, first upper, and second upper cooling tubes 171, 172, and 173 are fixed. In this way, the lower, first upper, and second upper cooling plates 121, 122, and 123, in which the lower, first upper, and second upper cooling tubes 171, 172, and 173 are integrally embedded, may be obtained. For example, the lower, first upper, and second upper cooling tubes 171, 172, and 173 and the lower, first upper, and second upper cooling plates 121, 122, and 123 may include different dissimilar metal materials. The lower, first upper, and second upper cooling tubes 171, 172, and 173 may include an SUS material having a relatively high melting point, and the lower, first upper, and second upper cooling plates 121, 122, and 123 may include an aluminum material having a relatively low melting point. For example, molten aluminum may be injected in the state where the lower, first upper, and second upper cooling tubes 171, 172, 173 of the SUS material are temporarily fixed in the mold (not shown), and the lower, first upper, and second upper cooling tubes 171, 172, and 173 may maintain a solid state and maintain a tubular body. The lower, first upper, and second upper cooling tubes 171, 172, and 173 and the lower, first upper, and second upper cooling plates 121, 122, and 123 for burying the lower, first upper, and second upper cooling tubes 171, 172, and 173 may include an SUS material and an aluminum material, which have excellent heat conduction characteristics and different melting points, in order to dissipate heat from the battery packs that thermally contact the lower, first upper, and second upper cooling plates 121, 122, and 123.

As described above, the lower cooling tube 171 is embedded in the lower cooling plate 121 and the first upper cooling tube 172 is embedded in the first upper cooling plate 122. In addition, the second upper cooling tube 173 may be embedded in the second upper cooling plate 123. Thus, the lower cooling tube 171 may be arranged at the same level as the lower cooling plate 121, that is, at the first level h1 corresponding to the bottom of the entire battery module, and the first upper cooling tube 172 may be arranged at the same level as the first upper cooling plate 122, that is, at the second level h2 raised from the bottom level of the entire battery module. In addition, the second upper cooling tube 173 may be arranged at the same level as the second upper cooling plate 123, that is, at the third level h3 raised from the bottom level of the entire battery module. In this case, the second level h2 of the first upper cooling tube 172 and the third level h3 of the second upper cooling tube 173 may correspond to the same level.

The lower cooling tube 171 and the first upper cooling tube 172 or the lower cooling tube 171 and the second upper cooling tube 173 may be connected to each other through a front branching portion 150 and a rear branching portion 160. For example, the lower cooling tube 171 and the first upper cooling tube 172 may be connected to each other through the front branching portion 150. More specifically, as well as with the lower and first upper cooling tubes 171 and 172, an external connection tube 190 may be connected to the front branching portion 150. A cooling medium flowing from the external connection tube 190 may be distributed to the lower and first upper cooling tubes 171 and 172 through the front branching portion 150, and a cooling medium from the lower and first upper cooling tubes 171 and 172 may be collected in the front branching portion 150 and discharged to the external connection tube 190. A low-temperature cooling medium introduced through the external connection tube 190 and the front branching portion 150 may be branched into the lower and first upper cooling tubes 171 and 172 and perform heat exchange with the battery packs of the first and second groups. The cooling medium heated to a high temperature through the heat exchange may be collected in the front branching portion 150 and then discharged through the external connection tube 190 connected to the front branching portion 150.

As described below, the cooling medium flowing through the lower cooling tube 171 may be branched into the second upper cooling tube 173 through the rear branching portion 160. That is, a portion of the cooling medium flowing into the lower cooling tube 171 through the front branching portion 150 may return to the front branching portion 150 via a bypass flow path 171B after dissipating heat from the battery pack of the first group, and the other portion of the cooling medium flowing into the lower cooling tube 171 may flow into the second upper cooling tube 173 through the rear branching portion 160.

The front branching portion 150 may be formed at a front position in the entire battery module and the rear branching portion 160 may be formed at a rear position in the entire battery module. Reference numeral 150' in FIG. 2 and reference numeral 150 in FIG. 6 denote front branching portions, but different reference numerals are given since only a portion (lower portion) of a front branching portion is shown in FIG. 2. Similarly, reference numeral 160' in FIG. 2 and reference numeral 160 in FIG. 6 denote rear branching portions, but different reference numerals are given since only a portion (lower portion) of a rear branching portion is shown in FIG. 2.

The lower cooling tube 171 and the second upper cooling tube 173 may be connected to each other through the rear branching portion 160. The cooling medium of the lower cooling tube 171 may flow into the second upper cooling tube 173 through the rear branching portion 160 and may return to the lower cooling tube 171 through the rear branching portion 160 after dissipating heat from the battery pack of the third group. For example, a portion of the cooling medium flowing through the lower cooling tube 171 may bypass the rear branching portion 160 via the bypass flow path 171B without passing through the rear branching portion 160 after dissipating only heat from the battery pack of the first group, and the other portion of the cooling medium flowing through the lower cooling tube 171 may dissipate heat from the battery pack of the first group and dissipate heat from the battery pack of the third group through the rear branching portion 160. As described above, the bypass flow path 171B and a flow path 171A passing through the rear branching portion 160 are formed in parallel along a flow path of the lower cooling tube 171, and a start point and an end point of the bypass flow path 171B are separate from a start point and an end point of the flow path 171A of the rear branching portion 160 at the front branching portion 150 along a circulation path of the first cooling tube 171.

By forming the bypass flow path 171B along the flow path of the lower cooling tube 171, the heat dissipation of the battery pack of the first group including the largest number of battery packs may be efficiently performed. For example, a cooling medium flowing through the bypass flow path 171B may maintain a somewhat low temperature and may efficiently cool the battery pack of the first group even in the process of returning to the front branching portion 150.

The battery packs of the first to third groups may be dispersedly arranged on the lower, first upper, and second upper cooling plates 121, 122, and 123 arranged at different positions. In order to uniformly dissipate heat from the battery packs of the first to third groups dispersedly arranged in a plurality of positions, the lower, first upper, and second upper cooling tubes 171, 172, and 173 may have different diameters.

Since the lower cooling tube 171 is responsible for the heat dissipation of the battery pack of the first group including the largest number of battery packs, the lower cooling tube 171 may be formed to have the largest diameter. For example, the lower cooling tube 171 may have a diameter of 11 mm. The first upper cooling tube 172 is arranged at a position adjacent to the external connection tube 190 having a relatively high pressure while being responsible for the heat dissipation of the battery pack of the second group including the smallest number of battery packs. For this reason, in order to limit the cooling flow rate to the first upper cooling tube 172, the first upper cooling tube 172 may be formed to have the smallest diameter.

More specifically, the lower cooling tube 171 may include a flow path 171A passing through the rear branching portion 160 and a bypass flow path 171B bypassing the rear branching portion 160, along the flow path of the lower cooling tube 171. In this case, the longest flow path 171A connected to the second upper cooling tube 173 through the rear branching portion 160, that is, the longest flow path 171A connected from the lower cooling tube 171 to the second upper cooling tube 173, may be formed to have the largest diameter, for example, a diameter of 11 mm, to provide a relatively large flow rate. The bypass flow path 171B for bypassing the rear branching portion 160 along the flow path of the lower cooling tube 171 may be formed to have a relatively small diameter, for example, a diameter of 9 mm, such that the flow rate of a cooling medium is more limited in the bypass flow path 171B than in the flow path 171A of the rear branching portion 160. That is, the bypass flow path 171B of the lower cooling tube 171 has a smaller diameter than the flow path 171A of the rear branching portion 160, and thus, the lower cooling tube 171 extends to the second upper cooling tube 173 and more flow may be allocated to the flow path 171A of the rear branching portion 160 having a relatively large heat dissipation demand. In particular, since the diameter of the flow path 171A of the lower cooling tube 171, which extends to the second upper cooling tube 173 arranged at the farthest distance from the external connection tube 190, is relatively large, a flow resistance and a pressure drop may be reduced along the flow of a cooling medium and thus a proper flow rate may be secured.

The first upper cooling tube 172 is arranged at a position adjacent to the external connection tube 190 having a relatively high pressure while being responsible for the heat dissipation of the battery pack of the second group including the smallest number of battery packs. For this reason, in order to limit the cooling flow rate to the first upper cooling tube 172, the first upper cooling tube 172 may be formed to have the smallest diameter. For example, the first upper cooling tube 172 may be formed to have a diameter of 6 mm.

An upper portion of the lower cooling plate 121 having the lower cooling tube 171 embedded therein may have a flat shape, and a lower portion of the lower cooling plate 121 may have a convexly protruding shape according to the shape of the lower cooling tube 171. This structure stably supports the battery pack of the first group through the flat upper surface of the lower cooling plate 121 while forming sufficient thermal contact with the battery pack of the first group. In addition, since the lower surface of the lower cooling plate 121 is formed in a convexly protruding shape along the outer periphery of the lower cooling tube 171, the lower cooling tube 171 may be sufficiently embedded and a region where the lower cooling tube 171 is not formed may have a small thickness, and thus, the cost of materials and the weight of the entire battery module may be reduced. For example, a lower portion of the lower cooling tube 171 may be formed in the shape of surrounding the lower cooling tube 171 along the shape of a mold (not shown) in the process of forming the lower cooling plate 121.

Each of the lower, first upper, and second upper cooling tubes 171, 172, and 173 may include a plurality of tubular bodies. For example, the lower, first upper, and second upper cooling tubes 171, 172, and 173 may include a plurality of tubular bodies extending parallel to each other to evenly distribute a cooling medium over the entire areas of the lower, first upper, and second upper cooling plates 121, 122, and 123, in order to achieve a uniform heat dissipation effect over the entire areas of the lower, first upper, and second upper cooling plates 121, 122, and 123 where the battery packs are supported. In addition, the lower, first upper, and second upper cooling tubes 171, 172, and 173 may include a plurality of tubular bodies to form a circulation flow path including an inflow path from the external connection tube 190 and an outflow path toward the external connection tube 190. In this case, a fixing block 180 may be formed between adjacent tubular bodies extending parallel to each other to form the lower, first upper, and second upper cooling tubes 171, 172, and 173.

The fixed block 180 may function to bundle adjacent tubular bodies into one bundle, to maintain a constant interval therebetween, and to support the tubular bodies relative to each other. In particular, in the process of forming the first to second upper cooling plates 121, 122, and 123 in which the lower, first upper, and second upper cooling tubes 171, 172 and 173 are integrally formed, the fixing block 180 may function as a jig that keeps the lower, first upper, and second upper cooling tubes 171, 172, and 173 at a predetermined position against the flow of molten metal. More specifically, the lower, first upper, and second upper cooling tubes 171, 172, and 173 need to be temporarily fixed in a mold (not shown) for forming the lower, first upper, and second upper cooling plates 121, 122, and 123, and by injecting molten metal into a mold in which the lower, first upper, and second upper cooling tubes 171, 172, and 173 are temporarily fixed, the lower, first upper, and second upper cooling plates 121, 122, and 123 in which the lower, first upper, and second upper cooling tubes 171, 172, and 173 are integrally formed may be formed. In order to keep a plurality of tubular bodies of the lower, first upper, and second upper cooling tubes 171, 172, and 173 at a predetermined position against the pressure of molten metal injected at a high pressure, the fixing block 180 may connect the plurality of tubular bodies and keep the plurality of tubular bodies at a correct position.

For example, by accommodating a plurality of tubular bodies bounded by the fixing block 180 in a mold (not shown) for forming the lower, first upper, and second upper cooling plates 121, 122, and 123 and pressing an upper portion of the fixing block 180 through a fixing jig (not shown), the position of the fixing block 180 may be fixed and the plurality of tubular bodies may be fixed through the fixing block 180 so as not to move in the mold (not shown). In other words, the fixing block 180 may fix a plurality of tubular bodies for forming the lower, first upper, and second upper cooling tubes 171, 172, and 173 to each other and provide a pressing point at which an external fixing jig (not shown) may provide a predetermined pressure, and thus, the positions of the lower, first upper, and second upper cooling tubes 171, 172, and 173 may be fixed such that the lower, first upper, and second upper cooling tubes 171, 172, and 173 are formed at uniform depths in the lower, first upper, and second upper cooling plates 121, 122, and 123 and do not protrude to the outside. In this case, since the fixing block 180 provides a pressing point of the external fixing jig (not shown) and also maintains contact with the external fixing jig (not shown) even when molten metal is injected, the fixing block 180 may be exposed to at least one of the upper surface and the lower surface of each of the lower, first upper, and second upper cooling plates 121, 122, and 123 having completed forms.

The fixing block 180 may be embedded in the lower, first upper, and second upper cooling plates 121, 122, and 123 while being embedded in the molten metal. The fixing block 180 may include the same metal material as the lower, first upper, and second upper cooling plates 121, 122, and 123. For example, the fixing block 180 may include the same aluminum material as the lower, first upper, and second upper cooling plates 121, 122 and 123. That is, the fixing block 180 may be tightly coupled with the lower, first upper, and second upper cooling plates 121, 122, and 123 without a defect such as a crack in the process in which the fixing block 180 is embedded in an aluminum molten metal for forming the lower, first upper, and second upper cooling plates 121, 122, and 123 and is cooled and hardened. For example, the fixed block 180 and the lower, first upper, and second upper cooling plates 121, 122, and 123, which include the same material and have the same material characteristics, may be in close contact with each other during the cooling and hardening process to thereby form a rigid coupling.

The fixing block 180 may include an upper unit 181 and a lower unit 182 which are coupled to face each other with a lower cooling tube 171 therebetween, and may further include a coupling unit 183 for coupling the upper unit 181 and the lower unit 182 together.

Hereinafter, a leakage blocking structure of the front and rear branching portions 150 and 160 is described. The leakage blocking of the front and rear branching portions 150 and 160 may denote preventing the leakage of the front and rear branching portions 150 and 160 from penetrating into the battery packs. The front branching portion 150 is a portion where the lower and first upper cooling tubes 171 and 172 are connected to the external connection tube 190, and the risk of leakage is relatively high in the front branching portion 150. In addition, the rear branching portion 160 is a portion where the lower and second upper cooling tubes 171 and 173 are connected to each other, and the risk of leakage is relatively high in the rear branching portion 160.

The front branching portion 150 may includes a first lower branching block 151 formed at the first level h1, a first upper branching block 152 formed at the second level h2, and a first connection portion 153 connecting the first lower branching block 151 to the first upper branching block 152. In this case, the first lower branching block 151 and the first upper branching block 152 may be embedded in the lower cooling plate 121 and the first upper cooling plate 122, respectively. That is, as well as with the lower cooling tube 171, the first lower branching block 151 may be embedded in the lower cooling plate 121, and as well as with the first upper cooling tube 172, the first upper branching block 152 may be embedded in the first upper cooling plate 122. In this case, the first lower branching block 151 and the first upper branching block 152 may be embedded in the lower and first upper cooling plates 121 and 122 and completely surrounded by the lower and first upper cooling plates 121 and 122. Thus, the leakage of the first lower branching block 151 and the first upper branching block 152 may be prevented and the leakage may be blocked from penetrating into the battery packs.

In an embodiment, the rear branching portion 160 may include a second lower branching block 161 formed at the first level h1, a second upper branching block 162 formed at the third level h3, and a second connection portion 163 connecting the first upper branching block 161 to the second upper branching block 162. In this case, the second lower branching block 161 and the second upper branching block 162 may be embedded in the lower cooling plate 121 and the second upper cooling plate 123, respectively. That is, as well as with the lower cooling tube 171, the second lower branching block 161 may be embedded in the lower cooling plate 121, and as well as with the second upper cooling tube 173, the second upper branching block 162 may be embedded in the second upper cooling plate 123. In this case, the second lower branching block 161 and the second upper branching block 162 may be embedded in the lower and second upper cooling plates 121 and 123, respectively, and completely surrounded by the lower and second upper cooling plates 121 and 123, respectively. Thus, the leakage of the second lower branching block 161 and the second upper branching block 162 may be prevented and the leakage may be blocked from penetrating into the battery packs.

The second connection portion 163 may be formed to be the same as or similar to a first connection portion 153 to be described below.

In another embodiment, the rear branching portion 160 may include a second lower branching block 161, a second connection portion 163, and a second upper branching block 162. In this case, the second lower branching block 161 and the second upper branching block 162 are the same as or similar to those described above, and thus, detailed descriptions thereof are omitted.

The second connection portion 163 may have a double sealing structure. The second connection portion 163 may include a second lower connection tube 163A connected from the lower cooling tube 171, a second upper connection tube 163B connected from the second upper cooling tube 173, and a second connection block 163C connecting the second lower connection tube 163A to the second upper connection tube 163B. In this case, the second connection block 163C may couple the second lower connection tube 163A and the second upper connection tube 163B together while surrounding the outer circumferences thereof, and a sealing member (not shown) may be interposed between the inner circumference of the second connection block 163C and the outer circumferences of the second lower connection tube 163A and the second upper connection tube 163B. More specifically, two sealing members may be superposed between the inner circumference of the second connection block 163C and the outer circumference of the second lower connection tube 163A and thus a double sealing structure may be applied therebetween. Likewise, two sealing members may be superimposed between the inner circumference of the second connection block 163C and the outer circumference of the second upper connection tube 163B and thus a double sealing structure may be applied therebetween. The sealing members may include an elastic material surrounding the outer circumferences of the second lower connection tube 163A and the second upper connection tube 163B, and may include a rubber material such as an O-ring.

Hereinafter, for convenience of description, the rear branching portion 160 is be described in detail with reference to a case where the second connection portion 163 is formed as a double sealing structure.

The external connection tube 190, the lower cooling tube 171, and the first connection portion 153 may be connected to the first lower branching block 151 of the front branching portion 150. In this case, brazing coupling may be applied between the first lower branching block 151 and the external connection tube 190, between the first lower branching block 151 and the lower cooling tube 171, and between the first lower branching block 151 and the first connection portion 153. Similarly, the brazing coupling may be applied to the first lower branching block 151 of the front branching portion 150. In the first lower branching block 151 and the first upper branching block 152 to which a plurality of tubular bodies are connected, the brazing coupling may be applied between the first lower and upper branching blocks 151 and 152 and the plurality of tubular bodies, and thus, leakage between the first lower and upper branching blocks 151 and 152 and the plurality of tubular bodies may be prevented.

A leakage-free fluid connection may be formed in the front branching portion 150 through the brazing coupling, and a double sealing structure may be applied to the rear branching portion 160 to thereby form a leakage-free fluid connection. In this case, unlike an integral coupling such as brazing, even if a double sealing structure is applied to the rear branching portion 160, there is a possibility of leaking according to the pressure of a cooling medium. For example, in the rear branching portion 160, the lower cooling plate 121 (or the lower cooling tube 171) and the second upper cooling plate 123 (or the second upper cooling tube 173) may be detachably connected to each other to improve the assembly properties of the entire battery module. In this case, even if a double sealing structure is applied for an airtight connection, the possibility of leakage may be higher than in an integral coupling such as a brazing coupling.

For the above reasons, a drain hole (not shown) may be formed around the rear branching portion 160. For example, the drain hole may be formed in the lower cooling plate 121 under the rear branching portion 160. Even if a leakage occurs around the rear branching portion 160, more specifically, around the second connection block 163C of the rear branching portion 160, the leakage may be discharged to the outside through the drain hole of the lower cooling plate 121 and the penetration of the leakage into the battery packs may be prevented. For example, the drain hole may be formed as a through hole passing through the lower cooling plate 121.

Hereinafter, the first connection portion 153 is described in detail.

Figure 9:
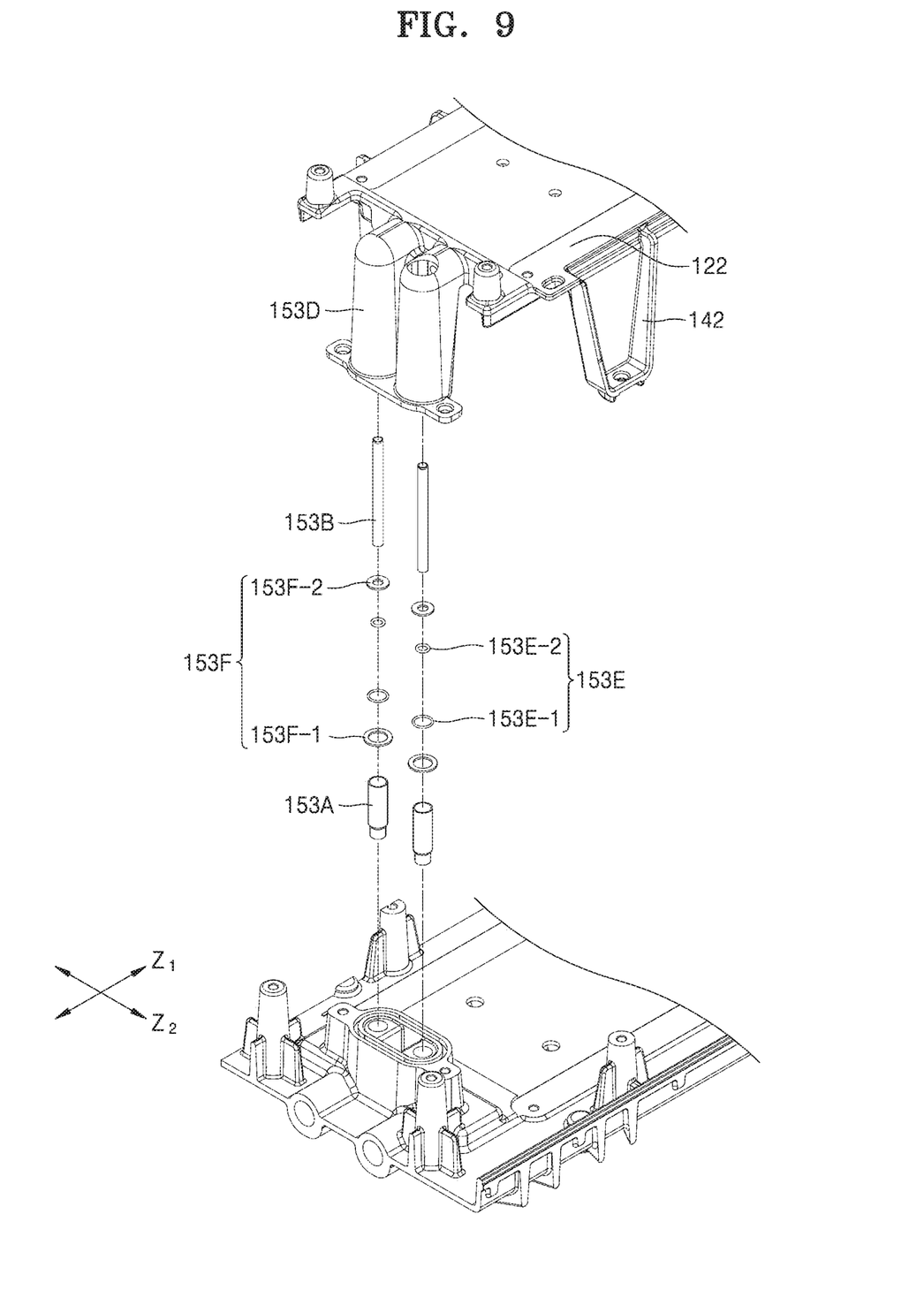
FIG. 9 is an exploded perspective view of a first connection portion shown in FIG. 6.
Figure 10:
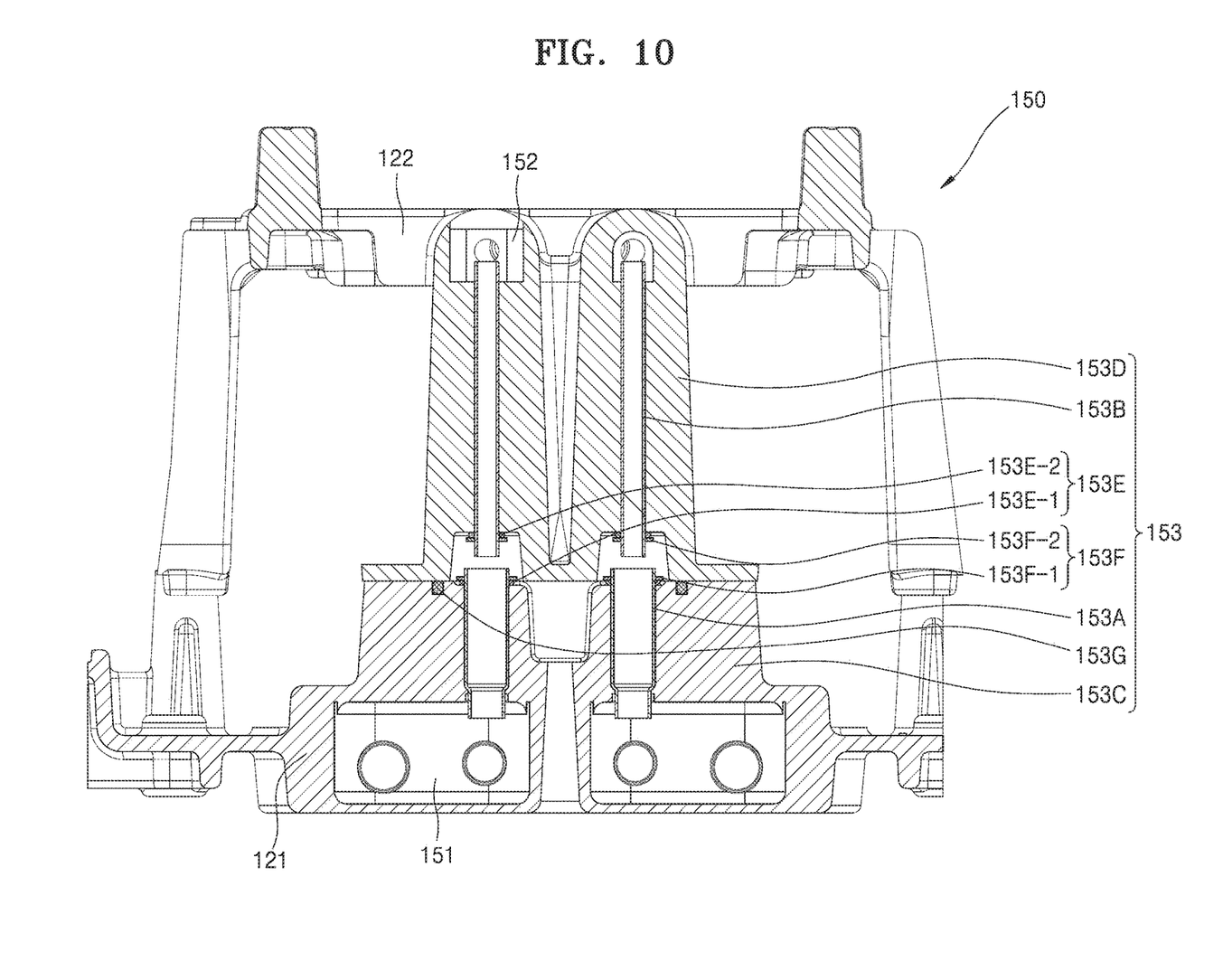
FIG. 10 is a cross-sectional view showing a coupling relationship of the first connection portion shown in FIG. 9.

FIG. 9 is an exploded perspective view of the first connection portion 153 shown in FIG. 6, and FIG. 10 is a cross-sectional view showing a coupling relationship of the first connection portion 153 shown in FIG. 9.

Referring to FIGS. 9 and 10, the first connection portion 153 may include a first lower connection tube 153A, a first upper connection tube 153B, a first lower connection housing 153C, a first upper connection housing 153D, a first tube sealing portion, a first fixing portion 153F, and a first housing sealing portion 153G.

The first lower connection tube 153A may be connected to a lower cooling tube (not shown) and an external connection tube (not shown). In this case, the first lower connection tube 153A may be connected to the lower cooling tube and the external connection tube through the first lower branching block 151.

The first upper connection tube 153B may be connected to the first lower connection tube 153A and a first upper cooling tube (not shown) through the first lower connection housing 153C and the first upper connection housing 153D, respectively. In this case, the first upper connection tube 153 may be connected to the first upper cooling tube 172 through the first upper branching block 152.

The first lower connection tube 153A and the first upper connection tube 153B may have the same or different inner diameters. For example, in an embodiment, the inner diameter of the first lower connection tube 153A may be the same as the inner diameter of the first upper connection tube 153B. In another embodiment, the inner diameter of the first lower connection tube 153A may be greater than the inner diameter of the first upper connection tube 153B. In another embodiment, the inner diameter of the first lower connection tube 153A may be less than the inner diameter of the first upper connection tube 153B. Hereinafter, for convenience of description, a case where the inner diameter of the first lower connection tube 153A is greater than the inner diameter of the first upper connection tube 153B is described in detail.

The first lower connection housing 153C may be integrated with the lower cooling plate 121. In this case, the first lower connection housing 153C may protrude from the lower cooling plate 121 toward the first upper cooling plate 122. The first lower branching block 151 and the first lower connection tube 153A may be arranged in the first lower connection housing 153C. The first lower connection tube 153A may be inserted into the first lower connection housing 153C. In this case, the first lower connection housing 153C and the first lower connection tube 153A may be integrated with each other or separately formed. Hereinafter, for convenience of description, a case where the first lower connection housing 153C and the first lower connection tube 153A are integrated with each other is described in detail. A space having an inner diameter that is greater than the inner diameter of the first lower connection tube 153A may be formed in the first lower connection housing 153C. In this case, the cross-sectional area of the first lower connection housing 153C, which is perpendicular to the longitudinal direction of the first lower connection tube 153A, may be greater than the inner cross-sectional area of the first lower connection tube 153A, which is perpendicular to the longitudinal direction of the first lower connection tube 153A. Thus, a portion of the interior of the first lower connection housing 153C may have a more extended shape than the interior of the first lower connection tube 153A.

The first upper connection housing 153D may be coupled with the first lower connection housing 153C. In this case, the first upper connection tube 153B and the first upper branching block 152 may be arranged in the first upper connection housing 153D. In particular, the first upper connection housing 153D may be integrated with or separate from the first upper connection tube 153B and may be coupled to the first upper connection tube 153B. Hereinafter, for convenience of description, a case where the first upper connection housing 153D and the first upper connection tube 153B are integrated with each other is described in detail. A space may be formed in the interior of the first upper connection housing 153D, similar to the interior of the first lower connection housing 153C. In this case, the cross-sectional area of the space in the interior of the first upper connection housing 153D, which is perpendicular to the longitudinal direction of the first lower connection housing 153C, may be greater than the cross-sectional area of the interior of the first lower connection housing 153C, which is perpendicular to the longitudinal direction of the first lower connection housing 153C.

The first tube sealing portion 153E may be arranged in at least one of an area between the first lower connection housing 153C and the first lower connection tube 153A and an area between the first upper connection housing 153D and the first upper connection tube 153B. For example, the first tube sealing portion 153E may include a first lower tube sealing portion 153E-1 arranged between the first lower connection housing 153C and the first lower connection tube 153A, and a first upper tube sealing portion 153E-2 arranged between the first upper connection housing 153D and the first upper connection tube 153B.

In the above case, the first lower tube sealing portion 153E-1 may be coated on the surfaces of the first lower connection housing 153C and the first lower connection tube 153A, or may be arranged between the first lower connection housing 153C and the first lower connection tube 153A in the shape of an O-ring. In this case, the first lower tube sealing portion 153E-1 may include rubber, silicone, or the like. Hereinafter, for convenience of description, a case where the first lower tube sealing portion 153E-1 includes a silicon material and is formed in an O-ring shape is described in detail.

The first upper tube sealing portion 153E-2 may be arranged between the first upper connection housing 153D and the first lower connection tube 153A. In this case, the first lower connection tube 153A may be inserted into the first upper tube sealing portion 153E-2, and the first upper tube sealing portion 153E-2 may be arranged between the first upper connection housing 153D and the first lower connection tube 153A.

The first fixing portion 153F may prevent the position of the first tube sealing portion 153E from being shifted. In this case, the first fixing portion 153F may be formed in the same shape as a stopper ring. The first fixing portion 153F may include a first lower fixing portion 153F-1 installed in the first lower connection tube 153A and a first upper fixing portion 153F-2 installed in the first upper connection tube 153B.

The first housing sealing portion 153G may be arranged between the first lower connection housing 153C and the first upper connection housing 153D. In this case, a groove may be formed in at least one of the first lower connection housing 153C and the first upper connection housing 153D to insert the first housing sealing portion 153G. Hereinafter, for convenience of description, a case where the groove is formed in the first lower connection housing 153C to insert the first housing sealing portion 153G is described in detail. The first housing sealing portion 153G may be formed in an O-ring shape and may include an elastic material such as rubber, synthetic resin, silicone, or the like.

A second connection portion (not shown) may connect the lower cooling tube to a second upper cooling tube (not shown). In this case, the second connection portion may be formed to be the same as or similar to the first connection portion 153 as described above. For example, the second connection portion may include a second lower connection tube (not shown), a second upper connection tube (not shown), a second lower connection housing (not shown), a second upper connection housing (not shown), a second tube sealing portion (not shown), a second fixing portion (not shown), and a second housing sealing portion (not shown). In this case, the second lower connection tube may be connected to the lower cooling tube, and the second upper connection tube may be connected to the second upper cooling tube. Also, the second lower connection housing may be connected to the lower cooling tube, and the second upper connection housing may be connected to the second upper cooling tube. The second tube sealing portion may include a second lower tube sealing portion arranged between the second lower connection housing and the second lower connection tube and a second upper tube sealing portion arranged between the second upper connection housing and the second lower connection tube. The second fixing portion may include a second lower fixing portion provided in the second lower connection tube and a second upper fixing portion provided in the second upper connection tube. The second housing sealing portion may be arranged between the second lower connection housing and the second upper connection housing. In this case, the second lower connection tube, the second upper connection tube, the second lower connection housing, the second upper connection housing, the second tube sealing portion, the second fixing portion, and the second housing sealing portion may be formed to be the same as or similar to the first lower connection tube 153A, the first upper connection tube 153B, the first lower connection housing 153C, the first upper connection housing 153D, the first tube sealing portion 153E, the first fixing portion 153F, and the first housing sealing portion 153G, respectively, described above, and thus, detailed descriptions thereof are omitted.

With respect to the installation of the first connection portion 153 as described above, the lower cooling plate 121 and the first upper cooling plate 122 may be arranged at different levels, and then the first lower connection housing 153C and the first upper connection housing 153D may be arranged to correspond to each other. In this case, a first lower tube sealing portion 153E-1, a first lower fixing portion 153F-1, and a first housing sealing portion 153G may be installed in the first lower connection housing 153C. In addition, a first upper tube sealing portion 153E-2 and a first upper fixing portion 153F-2 may be installed in the first upper connection housing 153D.

After the first lower connection housing 153C and the first upper connection housing 153D are arranged as described above, the first lower connection housing 153C and the first upper connection housing 153D may be coupled to each other. In this case, the connection between the first lower connection housing 153C and the first upper connection housing 153D may take various forms. For example, the first lower connection housing 153C and the first upper connection housing 153D may be coupled to each other through bolts, screws, or the like. As another embodiment, the first lower connection housing 153C and the first upper connection housing 153D may be coupled to each other by welding. As another embodiment, the first lower connection housing 153C and the first upper connection housing 153D may be coupled to each other through grooves, holes, and the like, which are coupled to protrusions, hooks, and the like, which are separately provided. In this case, the coupling between the first lower connection housing 153C and the first upper connection housing 153D is not limited to the above and may be made using all devices and structure for coupling the first lower connection housing 153C and the first upper connection housing 153D to each other. Hereinafter, for convenience of description, a case where the first lower connection housing 153C and the first upper connection housing 153D are coupled to each other through a bolt and a nut is described in detail.

When the first lower connection housing 153C and the first upper connection housing 153D are coupled to each other as described above, the first lower connection tube 153A and the first upper connection tube 153B may be arranged in the first lower connection housing 153C and the first upper connection housing 153D, respectively. In this case, one end of the first lower connection tube 153A and one end of the first upper connection tube 153B, which face each other, may be spaced apart from each other.

In this case, one end of the first lower connection tube 153A and one end of the first upper connection tube 153B, which are spaced apart from each other, may be arranged in a space formed between the first lower connection housing 153C and the first upper connection housing 153D. The space between the first lower connection housing 153C and the first upper connection housing 153D may be greater than the inner diameter of the first lower connection tube 153A and the inner diameter of the first upper connection tube 153B, to thereby temporarily storing cooling water.

In particular, even if the first lower connection tube 153A and the first upper connection tube 153B are not accurately arranged in the same line, the first lower connection tube 153A and the first upper connection tube 153B may be connected to each other through the first lower connection housing 153C and the first upper connection housing 153D.

Thus, in the battery module 100, the lower cooling tube and the first upper cooling tube may be simply connected to each other through the first connection portion 153. In addition, a leakage, which may occur after the lower cooling tube and the first upper cooling tube are connected to each other through the first connection portion 153, may be prevented, and thus, the life of the battery module may be prolonged and the stability thereof may increase.

In the battery module 100, since cooling tubes arranged on different planes are connected to each other through connection housings, a flow path of cooling water may be secured even if the centers of the connection tubes are displaced from each other. In addition, since a space is formed between the connection housings, a back flow phenomenon inside the connection tubes may be reduced.

While preferred embodiments of the present disclosure have been described, various changes or modifications may be made therein without departing from the spirit and scope of the present disclosure. Accordingly, the appended claims cover all such changes and modifications falling within the spirit and scope of the present disclosure.

INDUSTRIAL APPLICABILITY

Embodiments of the present disclosure provide battery modules that are easy to assemble and prevent a leakage, and the embodiments of the present disclosure may be applied to electric vehicles, ships, electric bicycles, and the like, which use battery packs or the like.

The invention claimed is:
1. A battery module comprising:
a lower cooling plate;
a lower cooling tube arranged in the lower cooling plate;
an upper cooling plate;
an upper cooling tube arranged in the upper cooling plate, the upper cooling tube being connected to the lower cooling tube and arranged in a different plane that is spaced in a first direction from a plane in which the lower cooling tube is arranged; and
a branching portion connecting the lower cooling tube to the upper cooling tube,
wherein the branching portion comprises:

a lower connection tube connected to the lower cooling tube and extending away from the lower cooling tube along the first direction;

an upper connection tube connected to the upper cooling tube and extending away from the upper cooling tube along a direction opposite the first direction;

a lower connection housing arranged to surround an outer surface of the lower connection tube; and an upper connection housing arranged to surround an outer surface of the upper connection tube, the upper connection housing being coupled to the lower connection housing.

2. The battery module of claim 1, wherein the branching portion further comprises:

a tube sealing portion arranged in at least one of an area between the lower connection housing and the lower connection tube and an area between the upper connection housing and the upper connection tube.

3. The battery module of claim 2, wherein the branching portion further comprises:

a fixing portion arranged in the upper connection tube and the lower connection tube and fixing a position of the tube sealing portion.

4. The battery module of claim 1, wherein the branching portion further comprises:

a housing sealing portion arranged between the upper connection housing and the lower connection housing.

5. The battery module of claim 1, wherein a cross-sectional area of a space formed by the upper connection housing and the lower connection housing is greater than at least one of a cross-sectional area of the upper connection tube perpendicular to a longitudinal direction of the upper connection tube and a cross-sectional area of the lower connection tube perpendicular to a longitudinal direction of the lower connection tube.

6. The battery module of claim 1, wherein the upper connection tube and the upper connection housing are integrated and/or the lower connection tube and the lower connection housing are integrated.

7. The battery module of claim 1, further comprising:

a lower branching block arranged between the lower cooling tube and the lower connection tube.

8. The battery module of claim 1, further comprising:

an upper branching block arranged between the upper cooling tube and the upper connection tube.

* * * * *